(12) United States Patent
Tidhar

(10) Patent No.: US 10,368,248 B2
(45) Date of Patent: Jul. 30, 2019

(54) DYNAMIC LINK-BUDGET MONITORING AND GRAPHICAL DISPLAY

(71) Applicant: ELTA SYSTEMS LTD., Ashdod (IL)

(72) Inventor: Nir Tidhar, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 158 days.

(21) Appl. No.: 15/479,099

(22) Filed: Apr. 4, 2017

(65) Prior Publication Data

US 2017/0311174 A1  Oct. 26, 2017

(30) Foreign Application Priority Data

Apr. 20, 2016 (IL) .......................... 245277

(51) Int. Cl.
*H04W 16/18* (2009.01)
*B64C 39/02* (2006.01)
*G01C 21/20* (2006.01)
*G05D 1/00* (2006.01)
*G06T 11/20* (2006.01)
(Continued)

(52) U.S. Cl.
CPC ........... *H04W 16/18* (2013.01); *B64C 39/024* (2013.01); *G01C 21/20* (2013.01); *G05D 1/0088* (2013.01); *G06T 11/206* (2013.01); *H04B 17/102* (2015.01); *H04B 17/23* (2015.01); *H04B 17/27* (2015.01); *H04B 17/373* (2015.01);
(Continued)

(58) Field of Classification Search
CPC ..... H04W 16/18; H04W 24/08; H04W 16/28; B64C 39/024; H04B 17/27; H04B 17/23; H04B 17/102; H04B 17/373; H04B 17/3912; G05D 1/0088; G06T 11/206; G01C 21/20; G06F 3/04815
See application file for complete search history.

(56) References Cited

U.S. PATENT DOCUMENTS 6,625,454 B1   9/2003 Rappaport et al.
2009/0257487 A1* 10/2009 Wang .................. H04B 7/0617
375/240.02
(Continued)

FOREIGN PATENT DOCUMENTS

CN    101938287 A    1/2011
EP      2498055 A2    9/2012
(Continued)

*Primary Examiner* — Mary Cheung
(74) *Attorney, Agent, or Firm* — Dorsey & Whitney LLP

(57) ABSTRACT

The presently disclosed subject matter includes: calculating link-budget of at least one antenna on-board a vehicle with respect to at least one target antenna; the link-budget comprises a respective link-budget value assigned to each pixel in a collection of pixels, where each pixel in the collection of pixels represents a respective radiation vector in a three-dimensional space around the at least one antenna; determining for each pixel in the collection of pixels, compliance of the respective link-budget value with a sensitivity threshold value of the transceiver, thereby obtaining a respective antenna envelope of the at least one on-board antenna; displaying on a computer display device graphical representation of a pixel map representing at least the respective antenna envelope; continuously monitoring dynamics of the input data for repeatedly updating the pixel map, and displaying an updated graphical representation of the pixel map.

25 Claims, 8 Drawing Sheets

(51) Int. Cl.
  *H04W 16/28* (2009.01)
  *H04W 24/08* (2009.01)
  *H04B 17/10* (2015.01)
  *H04B 17/23* (2015.01)
  *H04B 17/27* (2015.01)
  *H04B 17/373* (2015.01)
  *G06F 3/0481* (2013.01)
  *H04B 17/391* (2015.01)

(52) U.S. Cl.
  CPC ........... *H04W 16/28* (2013.01); *H04W 24/08* (2013.01); *G06F 3/04815* (2013.01); *H04B 17/3912* (2015.01)

(56) References Cited

U.S. PATENT DOCUMENTS

| | | | |
|---|---|---|---|
| 2011/0098033 A1* | 4/2011 | Britz | H01Q 3/44 455/422.1 |
| 2011/0263265 A1* | 10/2011 | Caretti | H04W 16/22 455/450 |
| 2012/0014367 A1* | 1/2012 | Caillerie | H04B 7/0639 370/345 |
| 2014/0045434 A1 | 2/2014 | Park et al. | |
| 2015/0162656 A1* | 6/2015 | Fitz-Coy | H01Q 1/288 343/705 |

FOREIGN PATENT DOCUMENTS

| | | |
|---|---|---|
| EP | 2960988 A1 | 12/2015 |
| KR | 101249825 B1 | 4/2013 |
| WO | 2010093999 A2 | 8/2010 |
| WO | 2016011199 A1 | 1/2016 |

\* cited by examiner

DYNAMIC LINK-BUDGET MONITORING AND GRAPHICAL DISPLAY

TECHNICAL FIELD

The presently disclosed subject matter relates in general to the field of telecommunication systems.

BACKGROUND

Various vehicles comprise different on-board systems which require one or more antennas to be mounted on the vehicle at different locations on the vehicle's body. For example, manned and unmanned aircrafts generally comprise avionic systems which are mounted at different locations on the aircraft's body. Antennas have specific requirements of size, weight, reliability and maintainability. Particularly, size and weight requirements restrict locations where the antenna can be installed since poor antenna placement can degrade the flying qualities of an aircraft and impact the performance of a relevant system. Additionally, antennas have limitations regarding to the directions in which radiation intensity is radiated. These factors, as well as others, influence the communication regime between on-board antennas and other target antennas.

On-board systems utilize antennas for functions such as communication, navigation and radar functions. These systems may be of crucial importance for operating and controlling the vehicle, and therefore avoiding communication loss is desired. For example, when an aircraft is an unmanned aerial vehicle (UAV), loss of communication with the UAV may trigger special procedures to be implemented which could result in destruction of the UAV.

GENERAL DESCRIPTION

According to one aspect of the presently disclosed subject matter there is provided a computer-implemented method of monitoring a dynamic link-budget of at least one on-board antenna fixed on a vehicle and operatively connected to a transceiver; the computer comprising at least one processor, the method comprising operating the at least one processor for:

(i) calculating link-budget of the at least one on-board antenna with respect to at least one target antenna; the link-budget comprises a respective link-budget value assigned to each pixel in a collection of pixels, where each pixel in the collection of pixels represents a respective radiation vector in a three-dimensional space around the at least one antenna; and wherein the link-budget is calculated based on input data including gain data and navigation-data;

determining for each pixel in the collection of pixels, compliance of the respective link-budget value with a sensitivity threshold value of the transceiver, thereby obtaining a respective antenna envelope of the at least one on-board antenna;

displaying on a computer display device graphical representation of a pixel map representing at least the respective antenna envelope; wherein the pixel map indicates with respect to each pixel, compliance with the threshold value, along with an indication of the relative location of the at least one target antenna;

(ii) continuously monitoring dynamics of the input data and repeating the operations in (i) wherein in each repetition:

utilizing updated navigation-data, if such exists, for repeatedly updating the pixel map, and displaying on the display device an updated graphical representation of the pixel map.

In addition to the above features, the method according to this aspect of the presently disclosed subject matter can optionally comprise one or more of features (i) to (xvi) below, in any technically possible combination or permutation:

1. wherein the gain data includes a respective radiation pattern of the at least one antenna and radiation power of the transceiver, and the navigation-data comprises a relative position of the at least one antenna and the at least one target antenna.

2. wherein updated navigation-data includes real-time navigation-data collected in real-time; the method comprising continuously displaying graphical representation of the pixel map as the vehicle progresses.

3. wherein updated navigation-data includes predicted navigation-data; the method comprising: continuously displaying graphical representation of the pixel map pertaining to a predicted location of the vehicle.

4. the method further comprising, utilizing a navigation unit for determining real-time navigation-data.

5. wherein there is a plurality of on-board antennas on the vehicle, the method further comprising generating and displaying graphical representation of a pixel map of each one of the plurality of on-board antennas.

6. the method further comprising displaying an overlap between the antenna envelope of different antennas of the plurality of on-board antennas.

7. wherein the collection of pixels in the pixel map are drawn over a two dimensional spherical coordinate system.

8. The method further comprising generating the pixel map including: assigning one or more radiation pattern angles to a respective pixel in the pixel map.

9. wherein the navigation-data includes simulated navigation-data of a simulated progression path of the vehicle and the pixel map is a simulated pixel map generated based on the simulated navigation-data; the method comprising:

simulating link-budget of the at least one on-board antenna along the simulated progression path; and generating output including location along the simulated progression path where communication loss with the target antenna is expected.

10. wherein there is a plurality of on-board antennas on the vehicle; the method comprising:

generating a switching scheme to be executed in real-time; the antennas switching scheme comprising instructions indicating when to switch between antennas in order to maintain continuous communication link to a target antenna.

11. autonomously generating antenna switching commands for switching between antennas to avoid communication loss.

12. The method further comprising: autonomously generating steering commands for controlling the vehicle and maintaining the vehicle within the antenna envelope.

13. wherein the vehicle is an aircraft 14. wherein the vehicle is an autonomous vehicle.

15. The method further comprising: generating an alert if communication loss has occurred and/or is anticipated.

16. wherein displaying of the graphical representation of the pixel map is done in a manner which simulates a point of view seen from the front cabin of the vehicle.

According to another aspect of the presently disclosed subject matter there is provided a computer-implemented system for monitoring dynamic link-budget of at least one on-board antenna fixed on a vehicle and operatively connected to a transceiver; the computer comprising at least one processing unit comprising one or more computer processors operatively connected to computer memory; the processing unit is configured to:

(i) calculate link-budget of the at least one on-board antenna with respect to at least one target antenna; the link-budget comprises a respective link-budget value assigned to each pixel in a collection of pixels, where each pixel in the collection of pixels represents a respective radiation vector in a three-dimensional space around the at least one antenna; and wherein the link-budget is calculated based on input data including gain data and navigation-data;

determine for each pixel in the collection of pixels, compliance of the respective link-budget value with a sensitivity threshold value of the transceiver, thereby obtaining a respective antenna envelope of the at least one on-board antenna;

display on a computer display device graphical representation of a pixel map representing at least the respective antenna envelope; wherein the pixel map indicates with respect to each pixel, compliance with the threshold value, along with an indication of the relative location of the at least one target antenna;

(ii) continuously monitor dynamics of the input data and repeating the operations in (i) wherein in each repetition:

utilize updated navigation-data, if such exists, for repeatedly updating the pixel map, and displaying on the display device an updated graphical representation of the pixel map.

In addition to the above features, the system according to this aspect of the presently disclosed subject matter can optionally comprise one or more of features (i) to (xvi) above, in any technically possible combination or permutation:

According to another aspect of the presently disclosed subject matter there is provided a non-transitory program storage device readable by a computer, tangibly embodying computer readable instructions executable by the computer to perform a method of monitoring dynamic link-budget of at least one on-board antenna fixed on a vehicle; the computer comprising at least one processing unit, the method comprising operating the at least one processor for:

(i) calculating link-budget of the at least one on-board antenna with respect to at least one target antenna; the link-budget comprises a respective link-budget value assigned to each pixel in a collection of pixels, where each pixel in the collection of pixels represents a respective radiation vector in three-dimensional space around the at least one antenna; and wherein the link-budget is calculated based on input data including: gain data and navigation-data;

determining for each pixel in a collection of pixels, compliance of the respective link-budget value with a sensitivity threshold value of a transceiver operatively connected to the at least one antenna, thereby obtaining a respective antenna envelope of the at least one on-board antenna;

displaying on a computer display device graphical representation of a pixel map representing at least the respective antenna envelope; wherein the pixel map indicates with respect to each pixel, compliance with the threshold value, along with an indication of the relative location of the at least one target antenna;

(ii) continuously monitoring dynamics of the input data and repeating the operations in (i) wherein in each repetition:

using updated navigation-data, if such exists, for updating the pixel map, and displaying on the display device an updated graphical representation of the pixel map.

In addition to the above features, the program storage device according to this aspect of the presently disclosed subject matter can optionally comprise one or more of features (i) to (xvi) above, in any technically possible combination or permutation.

The presently disclosed subject matter further contemplates according to any one of the above aspects to:

determine, based on the antenna envelope, whether communication loss between the at least one antenna and target antenna occurred or is about to occur and if yes, generating an alert indicating the communication loss.

determine, based on the antenna envelope, whether communication loss between the at least one antenna and target antenna occurred or is about to occur and if yes, autonomously generating antenna switching instructions, based on the antenna envelope, for switching between antennas in order to switch to another antenna and avoid communication loss.

determine, based on the antenna envelope, whether communication loss between the at least one antenna and target antenna occurred or is about to occur and if yes, autonomously generating steering commands for controlling the vehicle and maintaining the vehicle within the antenna envelope and avoiding communication loss.

According to further aspects of the presently disclosed subject matter there is provided a computer-implemented method, a computer-implemented system and a computer storage device each directed, mutatis mutandis, for monitoring dynamic link-budget of at least one on-board antenna fixed on a vehicle and operatively connected to a transceiver;

the computer is operated for calculating link-budget of the at least one on-board antenna with respect to at least one target antenna; the link-budget comprises a respective link-budget value assigned to each pixel in a collection of pixels, where each pixel in the collection of pixels represents a respective radiation vector in a three-dimensional space around the at least one antenna; and wherein the link-budget is calculated based on input data including gain data and navigation-data;

determining for each pixel in the collection of pixels, compliance of the respective link-budget value with a sensitivity threshold value of the transceiver, thereby obtaining a respective antenna envelope of the at least one on-board antenna;

displaying on a computer display device graphical representation of a pixel map representing at least the respective antenna envelope; wherein the pixel map indicates with respect to each pixel, compliance with the threshold value, along with an indication of the relative location of the at least one target antenna;

continuously monitoring dynamics of the input data and utilizing updated navigation-data, if such exists, for repeatedly updating the pixel map, and displaying on the display device an updated graphical representation of the pixel map.

In addition to the above features, the method, system and storage device according to this aspect of the presently disclosed subject matter can optionally comprise one or more of features (i) to (xvi) above, in any technically possible combination or permutation.

According to further aspects of the presently disclosed subject matter there is provided a computer-implemented method, a computer-implemented system and a computer storage device each directed, mutatis mutandis, for monitoring dynamic link-budget of at least one on-board antenna fixed on a vehicle and operatively connected to a transceiver;

the computer is operated for calculating link-budget of the at least one on-board antenna with respect to at least one target antenna; the link-budget comprises a respective link-budget value assigned to each pixel in a collection of pixels, where each pixel in the collection of pixels represents a respective radiation vector in a three-dimensional space around the at least one antenna; and wherein the link-budget is calculated based on input data including gain data and navigation-data;

determining for each pixel in the collection of pixels, compliance of the respective link-budget value with a sensitivity threshold value of the transceiver, thereby obtaining a respective antenna envelope of the at least one on-board antenna;

generating a pixel map representing at least the respective antenna envelope; wherein the pixel map indicates with respect to each pixel, compliance with the threshold value, along with an indication of the relative location of the at least one target antenna;

continuously monitoring dynamics of the input data and utilizing updated navigation-data, if such exists, for repeatedly updating the pixel map.

According to some examples the method system and computer storage device are further directed, mutatis mutandis, for displaying a graphical representation of the pixel map on a computer display device and repeatedly updating the graphical representation of the pixel map according to the updated pixel map.

In addition to the above features, the method, system and storage device according to this aspect of the presently disclosed subject matter can optionally comprise one or more of features (i) to (xvi) above, in any technically possible combination or permutation.

The presently disclosed subject matter further contemplates a vehicle comprising the system according to some aspect of the presently disclosed subject matter. Wherein in various examples the vehicle is any one of: a manned vehicle; and autonomous vehicle. Wherein according to one example the vehicle is an aircraft (any airborne vehicle).

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Unless specifically stated otherwise, as apparent from the following discussions, it is appreciated that throughout the specification discussions utilizing terms such as "calculating", "determining", "determining", "displaying", "transmitting", "monitoring", "using", "utilizing" or the like, include actions and/or processes of a computer that manipulate and/or transform data into other data, said data represented as physical quantities, e.g. such as electronic quantities, and/or said data representing the physical objects.

System 100 described below is a computerized system which includes at least one computerized device. The terms "computer/computerized device", "computer", "processing unit", "control device" or variations thereof should be expansively construed to cover any kind of electronic device with data processing capabilities, including, by way of non-limiting example, a processor (e.g. digital signal processor (DSP), a microcontroller, a field programmable gate array (FPGA), an application specific integrated circuit (ASIC), etc.), or a device comprising a processor and computer memory such as a personal computer, a server computer device, or any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
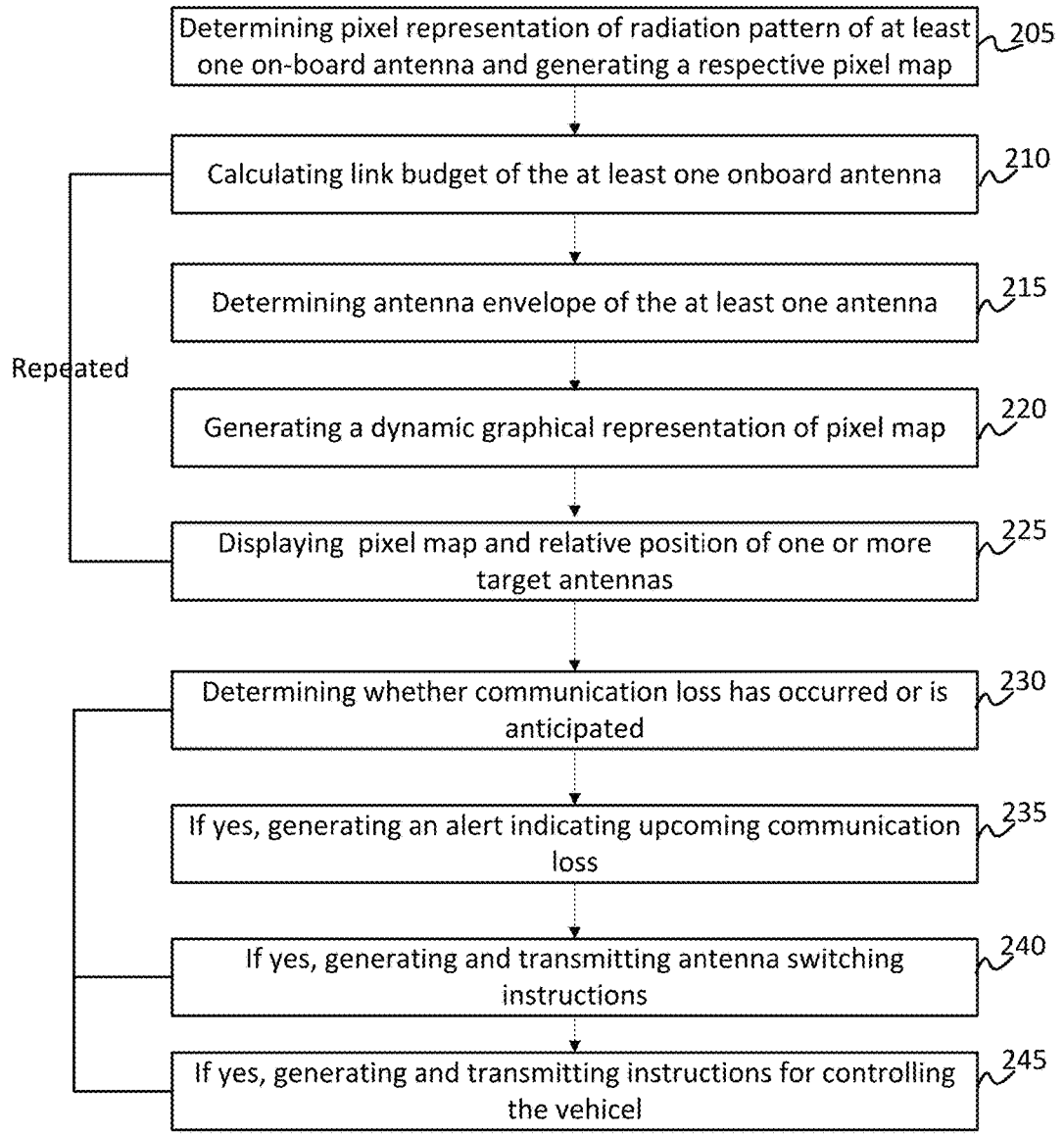
FIG. 2 is flowchart showing operations related to the generation and displaying of a dynamic link-budget pixel map, in accordance with an example of the presently disclosed subject matter.

In embodiments of the presently disclosed subject matter, fewer, more and/or different stages than those shown in FIG. 2 may be executed. In embodiments of the presently disclosed subject matter one or more stages illustrated in FIG. 2 may be executed in a different order and/or one or more groups of stages may be executed simultaneously.

Figure 1:
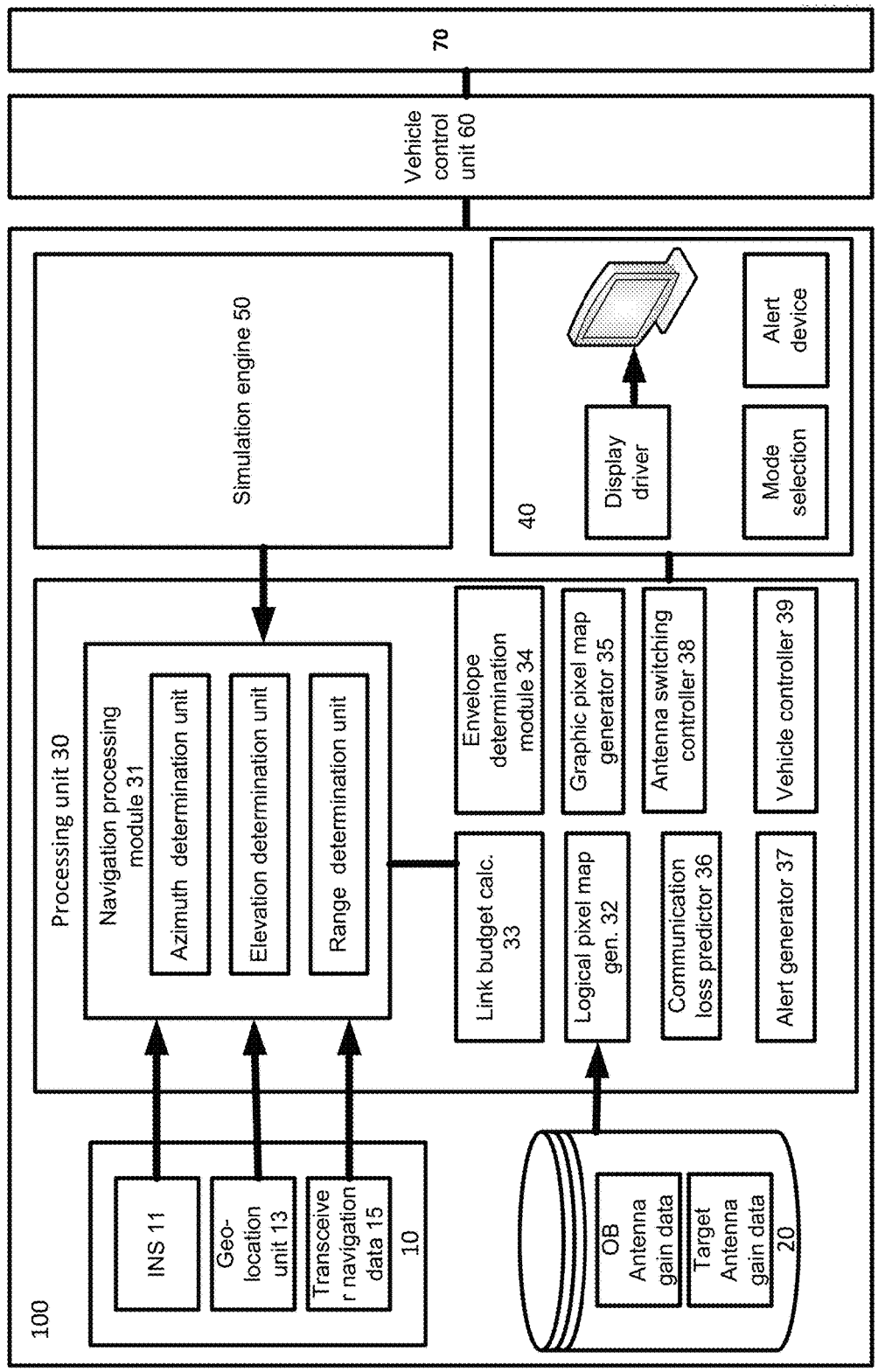
FIG. 1 is a functional block diagram of a system, in accordance with an example of the presently disclosed subject matter.

FIG. 1 illustrates a general schematic of a system architecture in accordance with an example of the presently disclosed subject matter. Functional elements in FIG. 1 can be made up of a combination of hardware with firmware and/or with software that performs the functions as defined and explained herein. Elements in FIG. 1 may be centralized in one location or dispersed over more than one location. In other examples of the presently disclosed subject matter, the system may comprise fewer, more, and/or different elements than those shown in FIG. 1. For example, vehicle controller 39 illustrated below as part of processing unit 30 can be otherwise implemented as a separate processing unit externally connected to processing unit 30.

In the present disclosure, the following terms and their derivatives may be understood in light of the below explanations:

Antenna Radiation Pattern (Directive Gain Pattern)—

The term antenna radiation pattern refers to the directional (angular) dependence of the strength of radio waves from/to the antenna. It can be expressed for example as a ratio of the radiation intensity in a given direction to the radiation of an isotropic source. Additionally, in the following, the antenna radiation pattern may include the radiation pattern of the antenna as such and also take into account interferences of the aircraft structure on the antenna pattern. Indeed, components such as the fuselage, wings, engines, etc. may affect the antenna radiation pattern depending on the location of the antenna on the aircraft. Additionally, the antenna radiation pattern may also include a scanning capability of the antenna. Indeed, the antenna may be a steerable antenna provided with scanning capability. Scanning capability may be provided mechanically, for example by a steerable platform accommodating the antenna, or electronically, for example by the antenna being a phased array antenna. In the following, the term radiation pattern may refer to the radiation pattern of the antenna including additionally the influence of the positioning of the antenna in the aircraft and/or the scanning capability of the antenna.

Techniques for determining the antenna radiation pattern may be based on numerical techniques of modeling the antenna and the aircraft. For example, software like WIPL-D, SAVANT, PATCH and APATCH may be used to create such models. Other techniques can also be used such as flight tests involving mounting the aircraft on a tiltable pedestal and illuminating the aircraft with a radiofrequency field over a wide range of orientations of the aircraft. Other techniques may also use a radiation chamber.

Transceiver—the term transceiver is well known in the art. The term "on-board transceiver" is used to refer to a transceiver on-board a vehicle operatively connected to one or more antennas for which a link-budget and respective pixel map are generated as disclosed herein. The term "Target transceiver" is used to refer to a transceiver used for communicating with the on-board transceiver. Notably, as known in the art, each transceiver may be connected to multiple antennas and have the ability to switch between the antennas. A vehicle may carry multiple on-board transceivers each operatively connected to one or more antennas and configured to communicate with multiple target transceivers, each likewise operatively connected to one or more antennas.

It is noted that the presently disclosed subject matter is applicable to various types of vehicles such as aerial, marine and ground vehicles (including both autonomous vehicles and manned vehicles) and is not limited to an aerial vehicle. In the following discussion part of the examples are made with specific reference to an aerial vehicle. This is done by way of example only and should not be construed as limiting in any way.

Bearing the above in mind, attention is drawn to FIG. 1 illustrating a functional block diagram of a system, according to an example of the presently disclosed subject matter. The system is configured to continuously monitor dynamic navigation-data (and possibly also dynamic gain data) pertaining to at least one antenna and repeatedly calculate one or more link-budgets and respective antenna envelopes. The system is further configured to generate and display graphical representation of the one or more respective antenna envelopes. The term "dynamic navigation-data" as used herein includes navigation-data which changes along a progression path of a vehicle including real-time navigation-data, predicted navigation-data and simulated navigation-data, all of which are explained below.

System 100 can comprise for example, navigation unit 10, computer storage 20, processing unit 30 operatively connected to at least one computer processor, and user interface 40. The system disclosed herein can be implemented as a dedicated control unit or as part of another control unit, configured to monitor dynamic link budget of a vehicle. In some examples, such as those related to unmanned vehicles, the system can be implemented in a control unit located remotely from the vehicle (implemented for example as part of UAV control station). In other examples, the system can be implemented in a control unit integrated on-board the vehicle. According to one specific example, system 100 can be implemented on a portable computerized device such as a laptop computer or Smartphone device with sufficient processing power.

Navigation unit 10 can be configured to obtain navigation-data of the vehicle and of one or more target transceivers and/or antennas used for communicating with the vehicle. The navigation-data can include data indicative of a position of the vehicle and orientation of the vehicle (e.g. determining 6 degrees of freedom of an aircraft). Navigation unit 10 can comprise or be otherwise operatively connected to a geo-location unit 13 and to an inertial navigation unit 11. The geo-location unit may be configured to provide real-time position of the aircraft. For example, the geo-location unit 13 can include a GNSS receiver of any type (e.g. GPS, GLO-NASS, Galileo or other). The inertial unit may be configured to provide real-time orientation of the aircraft. For example, the inertial unit may comprise a gyroscope or it can include MEMS based inertial sensors. Navigation-data with respect to the vehicle can be used for determining navigation-data with respect to the on-board antenna based on the known placement of the antenna on-board the vehicle.

Further, navigation unit 10 can also be configured to obtain, in real-time, position and/or orientation of the target transceiver and/or target antenna. For example, navigation-data can be received from the target transceiver unit. In some examples, where the target transceiver is stationary, part of all of the navigation-data pertaining to the transceiver can be pre-set and does not need to be updated.

It is noted that in some examples, INS 11 and geo-location unit 13 are located remotely from other components of system 100. For example, INS and GNSS receiver can be located on-board an aircraft while processing unit 30 is located at a ground control station. In such scenarios, processing unit 30 is configured to receive the navigation-data from the navigation devices on-board the vehicle over a remote communication link and use the received information for calculating and displaying the link-budget related data as disclosed herein.

Processing unit 30 can comprise for example one or more computer data storage devices loaded with instructions for causing one or more computer processor devices to execute various operations as described herein. Processing unit 30 is configured to repeatedly calculate for at least one antenna on-board the vehicle (herein "on-board antenna") a link-budget. The link-budget comprises a current (e.g. instantaneous) link-budget value of each pixel in a collection of pixels, wherein each pixel represents a certain radiation vector in the three-dimensional space surrounding the antenna. The link-budget value of each pixel provides the power of the signal received and transmitted by a transceiver in a specific direction. A link-budget is calculated for each different antenna separately.

Each transceiver, connected to one or more antennas, is characterized by a certain sensitivity threshold which defines the ability of the transceiver to discern between true signals and noise. A transceiver can detect signals only if the signal intensity (power), or signals received through a certain antenna, is greater than the transceiver sensitivity threshold. The processing unit is further configured to determine an antenna envelope defining directions relative to the vehicle and/or on-board transceiver for which the link-budget value of an antenna exceeds the transceiver sensitivity threshold, and generates a link-budget pixel map graphically representing the current antenna envelope picture.

The link-budget is calculated based on dynamic navigation-data as well as gain data corresponding to the on-board transceiver and respective antenna(s) and target transceiver and respective antenna(s). Depending on the specific mode of operation, dynamic navigation-data can be obtained from different sources. For example, in real-time mode, where real-time link-budget and antenna envelope of one or more on-board antennas is calculated, the navigation-data is obtained from navigation unit 10 on-board the vehicle. In prediction mode, where the predicated link-budget and antenna envelope of one or more on-board antennas is calculated, real-time navigation-data can be obtained from navigation unit 10 while processing unit 30 can be configured to calculate, based on the real-time navigation-data, the predicted link-budget and antenna envelope of the aircraft at some future point in time or some future location along an expected progression path of the vehicle. In simulation mode, where simulated link-budget and antenna envelope of one or more on-board antennas is calculated based on a simulated progression path, simulated navigation-data can be obtained from another source (e.g. simulation engine 50) while processing unit 30 can be configured to calculate the simulated link-budget and antenna envelope. According to some examples user interface 40 can include a mode selection module enabling an operator to select a preferred mode of operation for system 100, real-time, predicted or simulated.

Gain data can be retrieved for example from computer storage 20 which is accessible to processing unit 30. According to one example, computer storage 20 can comprise gain maps specifying the radiation patterns of on-board antennas and target antennas.

User interface 40 can comprise for example a computer display device (e.g. computer screen, head-up display, etc.) and various user input devices (e.g. computer mouse and keyboard, touchpad, touch screen, etc. for enabling user interaction). User interface 40 can also comprise a display driver configured to render a graphical representation of the pixel map, which can then be displayed on the display device.

The Applicant has found that providing a dynamic link-budget pixel map graphically representing real-time antenna envelope picture can assist an operator or pilot of a vehicle to maintain the on-board transceiver within the antenna envelope or one or more on-board antennas in order to avoid disruption of on-board systems relying on communication link with the transceiver.

Furthermore, this can provide an operator or pilot with the ability to anticipate the future antenna envelope picture of multiple on-board antennas and to control, based on this information, the communication regime of the vehicle in a manner which reduces the risk of communication loss. For example, an operator or pilot of an aircraft can use this information to control the flight route of the aircraft (e.g. UAV) in order to avoid entering a communication loss situation or improving communication quality. Also, an operator or pilot can use this information for determining appropriate time for switching between different antennas for the purpose of maintaining continuous communication link.

According to some examples, system 100 can comprise antennas switching controller 38 configured to autonomously control switching between antennas. Specifically switching controller 38 can be configured to generate instructions, to one or more transceivers, for switching from one on-board antenna to another on-board antenna according to the calculated antenna envelope. Antennas switching controller 38 can receive information from envelope determination module 34 and generate instructions for switching from one antenna which shows link-budget values below threshold (referred to herein as "antenna with a negative antenna envelope") to an antenna which shows link-budget values above the threshold (referred to herein as "antenna with a positive antenna envelope").

Furthermore, in an autonomous vehicle an autonomous control unit (e.g. autonomous flight control unit) can be configured to generate instructions for controlling the vehicle along a progression path selected to reduce communication loss with an on-board transceiver. System 100 can further comprise one or more vehicle controllers 39 configured to generate instructions for controlling the vehicle along a progression path which enables to avoid communication loss and/or improve communication quality with a transceiver.

According to one example, system 100 can operate in predictive mode and provide vehicle controller 39 with the predicted antenna envelope picture. Vehicle controller 39 can use the received information to update a progression path of the vehicle in real-time to avoid or reduce communication loss with a transceiver.

If it is determined (e.g. based on predicted antenna envelope picture) that proceeding along a certain progression path would cause a communication loss, vehicle controller 39 can generate and provide instructions to vehicle control unit 60 schematically representing one or more control units configured to control respective control devices 70 used for navigating the vehicle along a preferred progression path.

In the example of an aircraft (e.g. UAV), control devices 70 include for example throttle, stabilizers, ailerons and rudders. Clearly, in other vehicles different control devices exist depending on the specific type of vehicle. For example, in an Unmanned Ground Vehicle control devices may include steering, transmission, throttle and breaking mechanisms.

FIG. 2 is flowchart showing a sequence of operations related to the generation and displaying of a dynamic link-budget pixel map, in accordance with an example of the presently disclosed subject matter. Operations described with reference to FIG. 2 can be executed for example by system 100 described above with reference to FIG. 1. However, it is noted that the specific configuration of elements in system 100 is merely a non-limiting example and should not be construed as limiting in any way.

Generation of a dynamic link-budget pixel map (also referred herein in short as "pixel map") as described herein with reference to FIG. 2 can be executed for one or more (including any of 1, 2, 3, 4 etc.) antennas on-board an aircraft. A respective dynamic link-budget pixel map can be generated for each antenna. The dynamic nature of the pixel map results from constant updates made according to the changes in the navigation-data pertaining to the vehicle and/or the transceiver as well as updates to other signal attenuating factors such as changes to the weather.

The three-dimensional space around each antenna on-board the vehicle is represented by a spherical coordinate system, each point in the coordinate system representing a certain radiation pointing vector defined by an elevation angle (between 0° to 180°; conventionally marked by φ) and a turning or azimuth angle (between 0° to 360°; conventionally marked by θ). The radiation pattern mentioned above includes a certain directive gain value assigned to each angle in the spherical coordinate system.

At block 205 pixel representation of the radiation pattern of at least one on-board antenna is determined. According to the presently disclosed subject matter, the radiation pattern is represented by a collection of pixels. The number of pixels in the collection of pixels depends on the desired pixel resolution. Notably, a lower pixel resolution contributes to a reduced processing intensiveness and therefore enables faster processing. Thus, according to some examples, it may be desired to dilute the resolution of the radiation pattern (e.g. the radiation pattern having a resolution of 0 to 180° in elevation angle and 0 to 360° in turning angle).

According to one example, the pixel resolution is the same as the resolution of the spherical coordinate system of the radiation pattern, i.e. one pixel exists for each pointing vector (θ, φ) in the radiation pattern. According to other examples, the pixel resolution is greater or less than the resolution of the spherical coordinate system of the radiation pattern, e.g. a plurality of points (θ, φ) in the radiation pattern are represented by the same pixel.

In some examples, processing unit 30 can be configured to assign one or more points (θ, φ) to a respective pixel. Processing unit 30 can comprise logical pixel map generator 32 configured to retrieve from computer storage 20 a respective radiation pattern of at least one on-board antenna and generate a respective pixel map, where each pixel is assigned to one or more points (θ, φ) or in other examples a single point is represented by more than one pixel.

Various ways of diluting the resolution of the radiation pattern can be used. For example, integration of values (e.g. averaging) or selection of a portion of the values (e.g. reducing the resolution in half by taking only 1 out of two existing values in the radiation pattern).

At block 210 a link-budget of the antenna is calculated. This operation includes the calculation of a link-budget value for each pixel in the collection of pixels. Processing unit 30 can be configured to calculate (e.g. with the help of link-budget calculator 33) the link-budget.

The link-budget is calculated based on dynamic navigation-data and gain data. At least part of gain data is substantially constant and can therefore be retrieved from the data storage 20. At least part of the navigation-data depends on the current relative position between communicating antennas and is therefore repeatedly determined to detect changes in real-time.

Gain data includes information pertaining to the radiation patterns of the on-board and target antennas mentioned above (extracted for example from respective gain maps), as well as other parameters which influence the gain. For example, gain data can further include one or more of:

the respective transmission radiation power of on-board transceiver(s) as well as target transceiver(s); various signal attenuating factors in both the on-board transceiver and the target antenna transceiver; radio frequency value; weather conditions; antenna polarization, etc.

According to an example, processing unit 30 can comprise navigation processing module 31 configured to use data obtained from navigation unit 10 and determine information related to the relative position of the on-board antenna and target antenna including the relative position and orientation (6 DOF) of an on-board antenna and target antenna (e.g. with the help of azimuth determination unit and elevation determination unit); line of sight (LOS) between an on-board antenna and target antenna; range between on-board antenna and target antenna (e.g. with the help of range determination unit).

Notably, the navigation-data changes with any change in the relative position and orientation of the vehicle and/or the on-board as well as target transceiver (located for example in a control station or on-board another vehicle). Accordingly, the calculation of the link-budget is repeated in order to obtain the current (e.g. instantaneous) link-budget (intensity) values which depend on the varying parameters. Calculation of the link-budget from navigation-data and gain data can be done by ways which are generally known in the art.

At block 215 the antenna envelope is calculated. As mentioned above, an antenna envelope defines directions relative to the vehicle (e.g. aircraft) for which the link-budget value of the antenna exceeds the sensitivity threshold of the transceiver.

The actual threshold value used for determining the antenna envelope can be equal or greater than the transceiver sensitivity threshold. Processing unit 30 may be configured to derive the antenna envelope from the calculated link-budget and from the predetermined threshold. For example, processing unit 30 can comprise envelope determination module 34 configured to determine the antenna envelope.

Each link-budget value of each pixel can be compared to a threshold value and if the link-budget value is greater than (or equal to) the threshold, the respective pixel is assigned with a certain value (e.g. 1) indicating compliance with the threshold condition. Otherwise, if the link-budget value is smaller than (or equal to) the threshold value, the respective pixel is assigned with a different value (e.g. 0) indicating incompliance of the link-budget value with the threshold condition.

At block 220 a graphical representation of a pixel map is generated for each on-board antenna, graphically representing the respective antenna envelope. For example, the collection of pixels assigned to the radiation pattern points (θ, φ) can be drawn over a two dimensional coordinate system of a spherical representation. Color coding can be used, where each pixel is colored with a certain color depending on a respective link-budget value of the pixel. According to one example, if the link-budget value is above a threshold (within the antenna envelope), the respective pixel is colored in one color (e.g. green) and if the link-budget value is below (or equal to) the threshold value (outside the antenna envelope), the respective pixel is colored in a different color (e.g. white color). According to one example, processing unit 30 can comprise graphical pixel map generator 35 configured to generate a graphical object of the logical pixel map which can be visually displayed on a computer display device.

At block 225 the pixel map, as well as the relative position of the target antenna, are displayed on a computer display. To this end user interface 40 can comprise for example a display driver configured to render the pixel map on a display device. In some examples, generated pixel maps can be displayed in the same window, where different pixel maps of difference antennas are overlaid, and in other examples in separate windows, each designated for displaying a respective pixel map.

As mentioned above, operations described with reference to blocks 210 to 225 are performed repeatedly, where in each repetition updated input dated is used. The updated input data includes updated navigation-data and/or updated gain data. For example, in case these operations are used for determining and displaying the real-time antenna envelope picture, real-time navigation-data is used in each repetition. The pixel maps and their respective graphical representations are continuously updated to show real-time information.

An operator or pilot can view the displayed information, monitor the antenna envelope, and decide, based on the displayed information, what can be done in order to maintain or regain communication link with the target antenna. For example, the operator can generate maneuvering instructions for directing the vehicle to regain communication, or switching instructions to switch to a different antenna.

As explained above, according to some examples, the process described above can be executed in prediction mode. In prediction mode, a predicted antenna envelope is calculated and a predicted dynamic link-budget pixel map is generated and displayed. For example, assuming a desired or estimated flight route of an aircraft is known, the predicted antenna envelope picture at future locations of the aircraft (e.g. a few kilometers ahead along the aircraft's flight route) is calculated. To this end, the future navigation-data at a future location of the aircraft along the expected flight route is used to calculate the future antenna envelope at that time and a respective predicted pixel map is generated and displayed on the computer screen.

In prediction mode, the calculation of the antenna envelope picture and generation or update of the respective pixel map can also be repeated. For example, assuming the a pixel map is generated for displaying the predicted antenna envelope picture 3 miles ahead along the flight route of an aircraft, the respective calculations are repeated to continuously provide the correct prediction which changes as the aircraft proceeds along its flight route.

According to one example, the future navigation-data can be time based (i.e. predicted navigation-data in a future time); according to another example, the future navigation-data can be range based (i.e. predicted navigation-data at a certain distance from the current position); according to yet another example the future navigation-data can be position based (i.e. predicted navigation-data at a specific future location or along a certain section of the vehicle's progression path).

According to some examples, it is determined whether communication loss has occurred or is anticipated given the current or predicted antenna envelope(s) (block 230). In the event that communication loss has occurred, or is expected, an alert can be generated for alerting the operator or pilot of the communication loss (block 235). According to some examples, an alert can also be generated to indicate that autonomous antenna switching and/or vehicle redirection instructions are executed.

To this end processing unit 30 can be configured to determine whether communication loss (or substantial reduction in signal intensity) has occurred or is expected (e.g. with the help of communication loss predictor 36) and if so, to generate instructions for activating an alert of some sort for alerting the operator or pilot (e.g. with the help of alert generator 37). The alert can be of any kind (or a combination of different alerts) including: an on-display alert where information indicative of the pending alert is displayed on the display device; an audible alert (activating some type of distinctive sound); turning on a designated light; etc. Alert device in user interface can be any type of device which can be used for generating the alert such as, a lighting device, an audio speaker or a dedicated siren, a computer display, etc.

According to some examples, at block 240 if it is determined that communication loss has occurred or is anticipated, instructions to switch between antennas are generated (e.g. by antenna switching controller 38). The switching is made from one antenna which is anticipated to be (or is already) with a negative antenna envelope, to a different antenna which is or is about to be with a positive antenna envelope status. Instructions can be sent to one or more respective antenna controllers which are configured for controlling the operations of the antennas. In prediction mode the switching is synchronized with the time of the future communication loss.

Furthermore, instructions for controlling the vehicle can be generated, e.g. by one or more vehicle controllers 39 (block 245). Instructions can be provided to vehicle control unit 60 and may be directed for example, for maneuvering the vehicle in order to avoid communication loss of an antenna or maneuvering the vehicle to position at least one on-board antenna in a positive antenna envelope.

According to some examples the process described above can be executed in simulation mode. In simulation mode, a simulated progression path (e.g. flight route) of a vehicle is generated. The relative position and orientation of at least one on-board antenna and target antenna along the simulated progression path is fed to processing unit 30 (e.g. by simulation engine 50). The simulated navigation-data input is used for calculating a simulated dynamic link-budget and a respective simulated antenna envelope along the planned progression path. Optionally, a graphical representation of the simulated dynamic link-budget pixel map (which is being constantly updated to simulate the progression along the simulated path) can be also generated and displayed on the display device.

The simulation mode can assist for example in identifying anticipated communication losses along a progression path as it is being planned; plan a switching scheme between antennas to be executed in real-time for switching between antennas for the purpose of avoiding communication loss; and make changes to the progression path in order to avoid such communication loss in real-time.

Figure 3A:
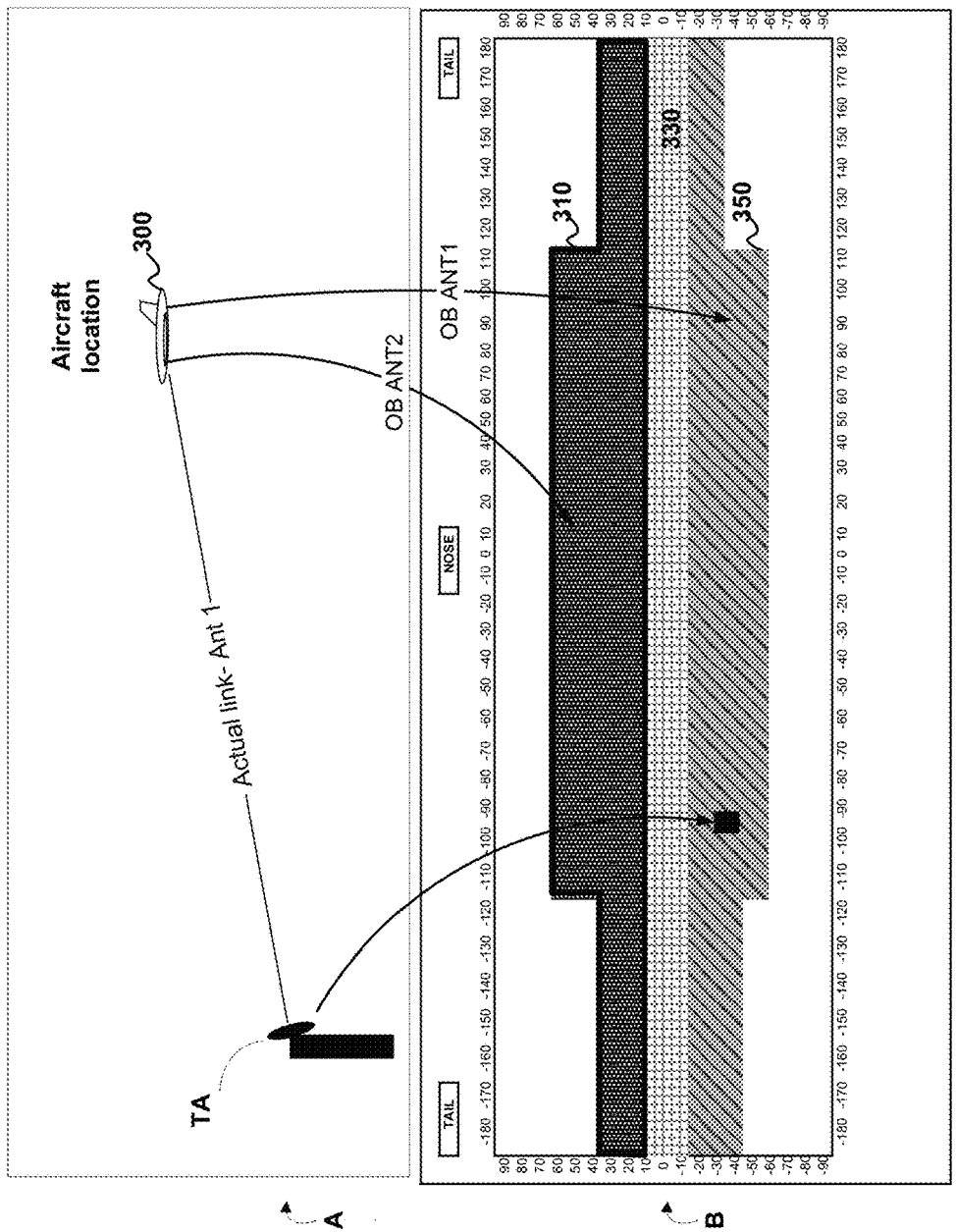
FIG. 3a is a first schematic illustration of a graphical user interface display, in accordance with an example of the presently disclosed subject matter.

Turning to FIG. 3a it shows a schematic illustration of graphical user interface display, according to an example of the presently disclosed subject matter. According to one non-limiting example, the graphic user interface (GUI) can include two windows, one window (A) displaying an illustration of a vehicle (in this example an aircraft) 300 and the target antenna TA, and another window (B) displaying a graphical display of the pixel map. Window B shows a graphical representation of the pixel map drawn on a spherical coordinate system used for representing the three-dimensional space around the antenna.

In one example, the azimuth angle (e.g. ranging from −180 to 180) is plotted on the X axis of the coordinate system (wherein the nose of the aircraft coincides with 0) and the elevation angle (e.g. ranging from −90 to 90) is plotted along the Y axis of the coordinate system. The areas in the graph which are colored are those containing pixels which have a link-budget value above (or possibly above or equal to) the threshold value, and the areas in the graph which are not colored, are those containing pixels which have a link-budget value below (or possibly below or equal to) the threshold value.

In the illustrated example two pixel maps are shown in window B, each pixel map representing the envelope of a respective antenna on-board aircraft. One pixel map (350) shows the envelope of a first on-board antenna (OB ANT1, where pixels having link-budget values above threshold are indicated by a diagonal stripes pattern). Another pixel map (310) shows the envelope of a second on-board antenna (OB ANT2, where pixels having link-budget values above threshold are indicated by a dotted pattern). Also one target antenna (TA) is shown (indicated by the dark rectangle). The area located in the center between the two pixel maps is the overlapping area (330), where both on-board antennas are within their envelope. Therefore, either one of the on-board antennas can be used for communicating with a target antenna located within the overlapping area.

FIG. 3a shows a snapshot of a dynamic pixel map representing link-budget data of the two on-board antennas at a certain instance ($T_1$). Notably, at the time of the illustrated snapshot $T_1$ the relative position of the target antenna (TA) and aircraft 300 is such that TA is located within the envelope of OB ANT1 (having a positive antenna envelope) but outside the envelope of OB ANT2 (having a negative antenna envelope). Therefore, during this time only OB ANT1 can be used for communicating with target antenna TA1.

Figure 3B:
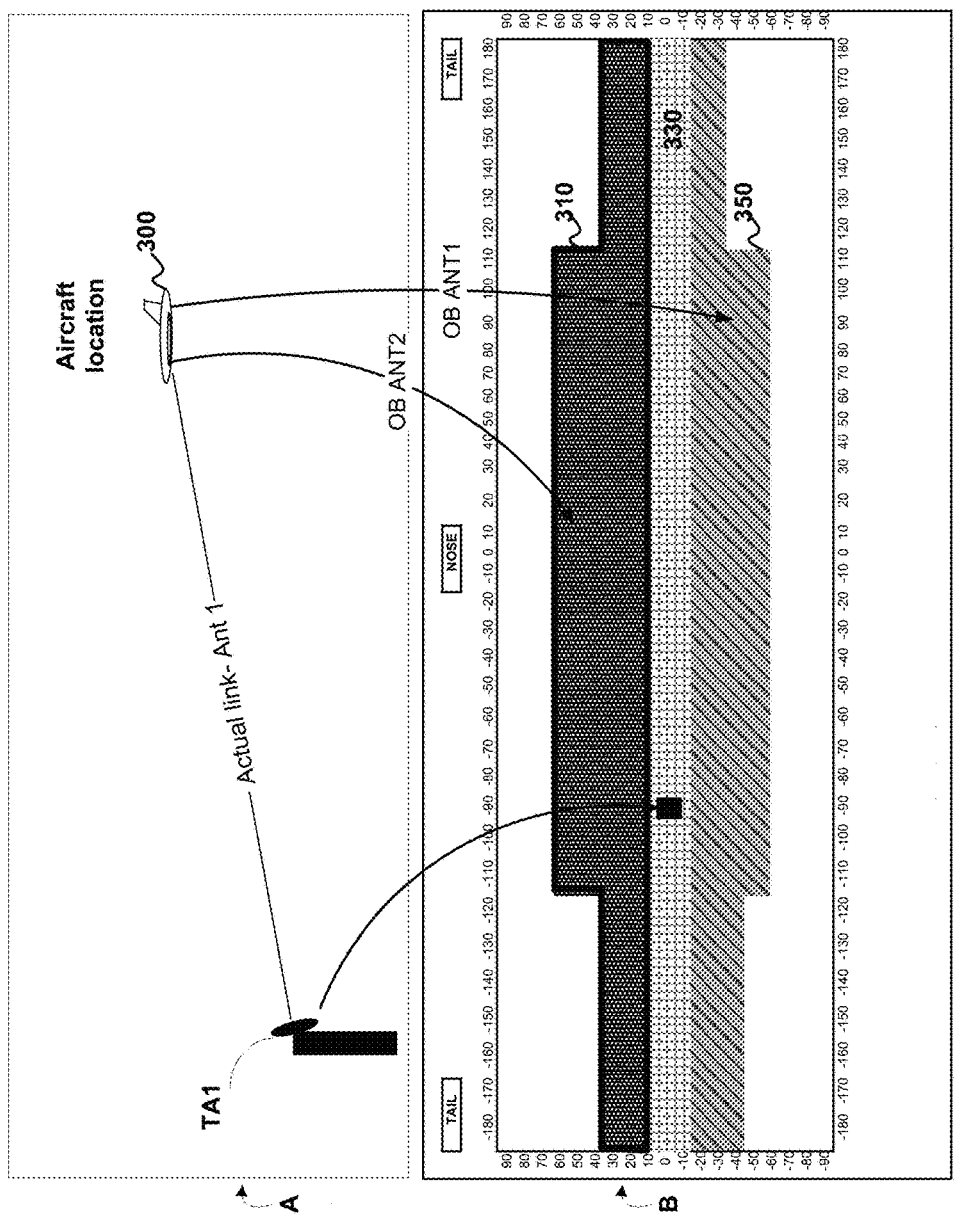
FIG. 3b is a second schematic illustration of a graphical user interface display, in accordance with an example of the presently disclosed subject matter.

FIG. 3b shows another schematic illustration of graphical user interface display, according to an example of the presently disclosed subject matter. This example shows the dynamic pixel map of the two on-board antennas shown in FIG. 3a at a later time instance $T_{1+}\Delta_1$ ($\Delta_1$ representing a certain time period following $T_1$). Notably, at time of the illustrated snapshot $T_{1+}\Delta_1$, the relative position of the target antenna (TA) and aircraft 300 is such that TA is located within the overlapping area 330 and therefore within the envelope of both OB ANT1 and OB ANT2. Therefore, during this time either one of antennas can be used for communicating with target antenna TA.

Figure 3C:
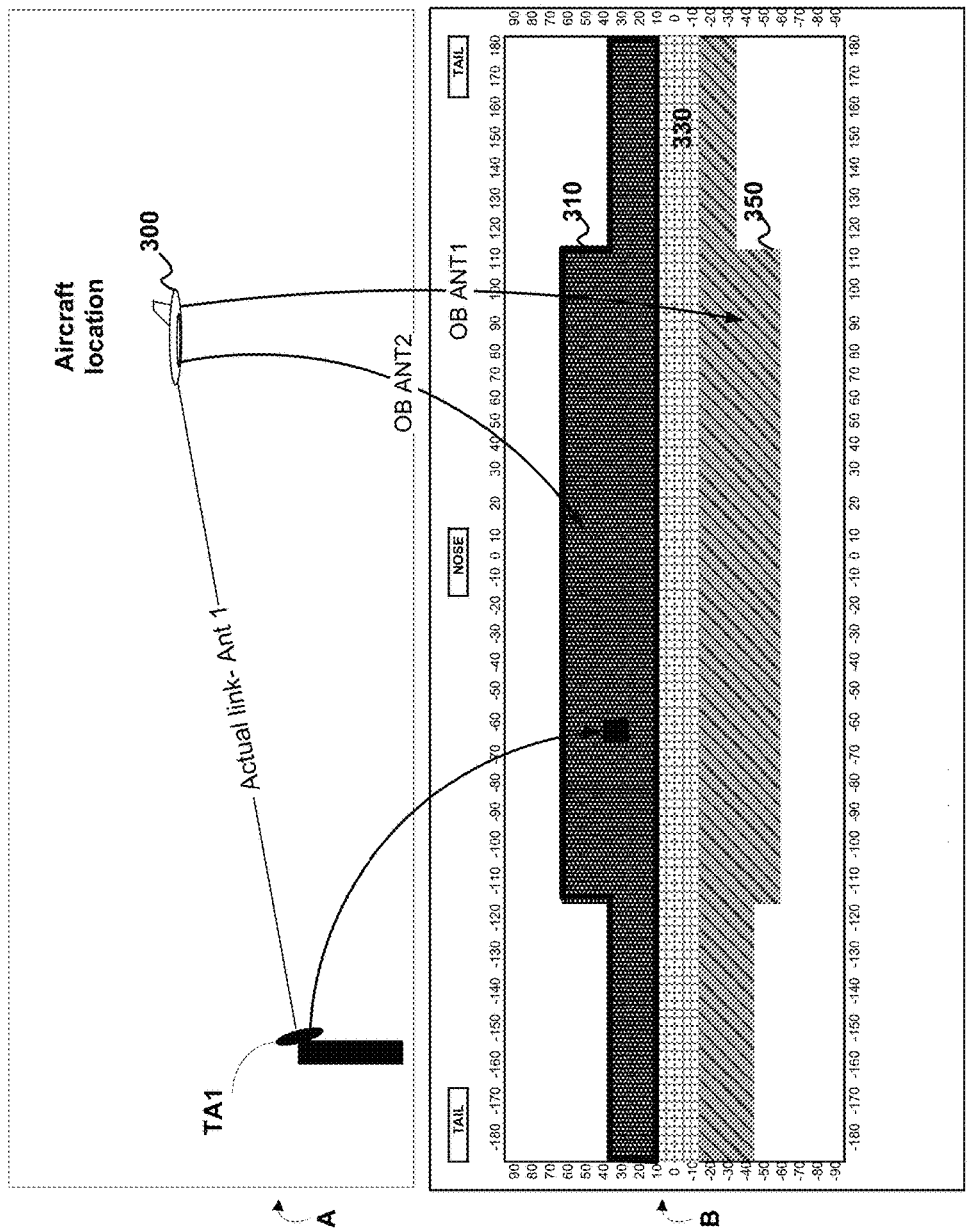
FIG. 3c is a third schematic illustration of a graphical user interface display, in accordance with an example of the presently disclosed subject matter.

FIG. 3c shows another schematic illustration of graphical user interface display, according to an example of the presently disclosed subject matter. This example shows the dynamic pixel map representing the link-budget data of the two on-board antennas at a certain instance ($T_{1+}\Delta_2$). Notably, at time of the illustrated snapshot $T_{1+}\Delta_2$ the relative position of the target antenna (TA) and aircraft 300 is such that TA is located outside the envelope of OB ANT1 (having a negative antenna envelope) but within the envelope of OB ANT 2 (having a positive antenna envelope). Therefore, during this time only OB ANT 2 can be used for communicating with target antenna TA.

FIGS. 3a to 3c show the displayed graphics which represent the dynamics of the antenna envelopes over time. As the aircraft travels, the displayed data is continuously adapted according to current link-budget of each on-board antenna. The graphical display accordingly is continuously updated and refreshed, based on dynamic data to provide an animated display of a dynamic link-budget pixel map as the vehicle is proceeding along its progression path.

By maintaining the nose of the vehicle (e.g. aircraft) constantly aligned with the center of the graph (0 coordinate) the graphical representation of the pixels maps provides and visually simulates the point of view seen from the front cabin of the vehicle (e.g. a cockpit of an aircraft). An operator viewing the pixel map is thus provided with a visual sensation as if he is sitting in the vehicle as the vehicle is advancing along the progression path.

Notably, while the examples in FIGS. 3a to 3c have shown the graphical representation of two pixel maps of two on-board antennas, in other examples a single pixel map or more pixel maps of more antennas can be shown as well.

Figure 4:
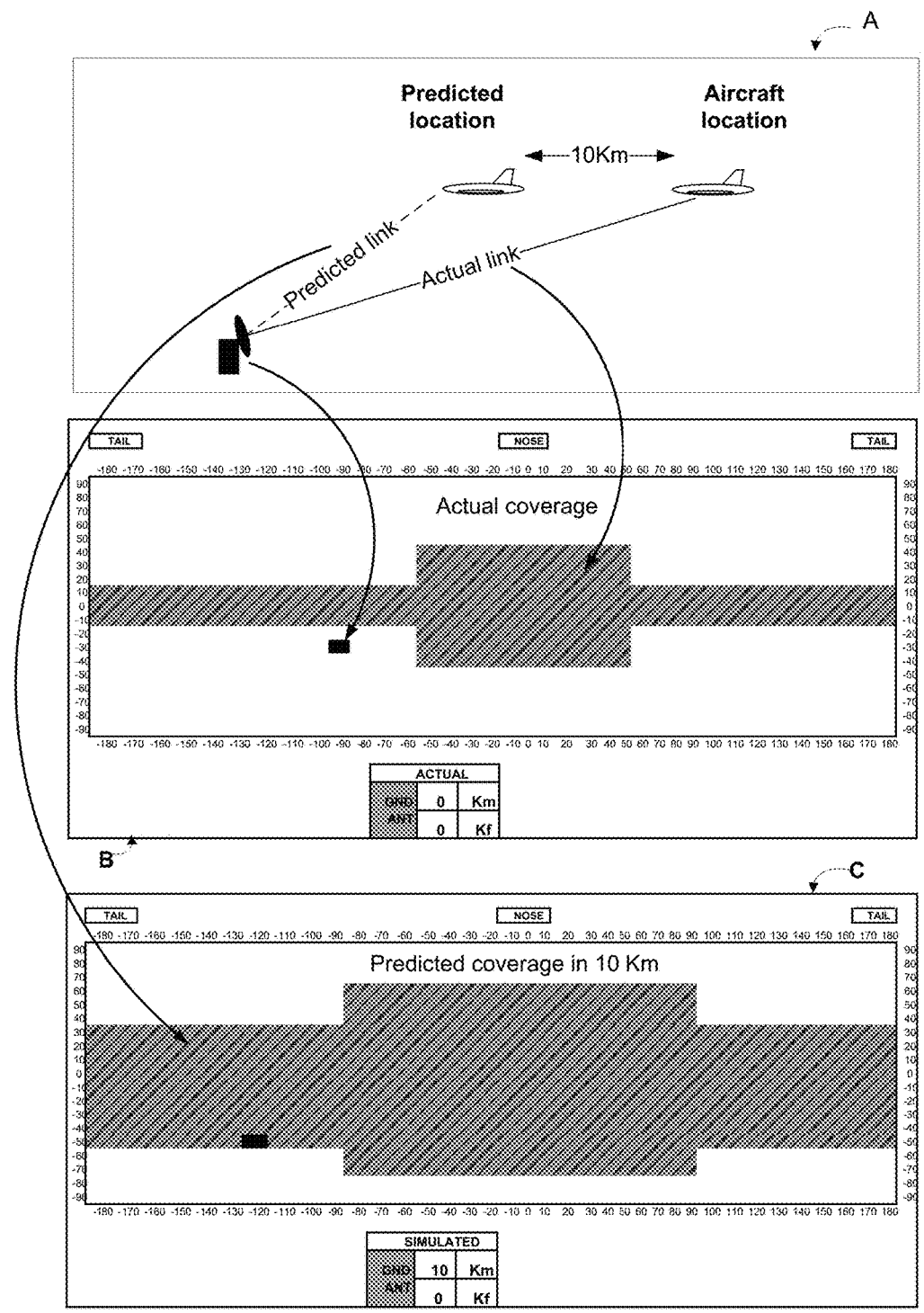
FIG. 4 is a schematic illustration of graphical user interface display in prediction mode, according to an example of the presently disclosed subject matter.

Turning to FIG. 4 it shows another schematic illustration of graphical user interface display in prediction mode, according to an example of the presently disclosed subject matter.

FIG. 4 shows a schematic illustration of graphical user interface display similar to that shown in FIGS. 3a to 3c. FIG. 4 shows an example of a screen display in prediction mode. The screen display includes three windows. Window A shows an illustration of aircraft 300 and its relative position with respect to target antenna TA. Window B shows the real-time envelope of an on-board antenna and the relative position of the target antenna. Window C shows a predicted envelope of an on-board antenna (e.g. 10 Km ahead of the real-time position) and the relative position of the target antenna.

As described above, the real-time pixel map is repeatedly calculated and updated based on real-time navigation-data. Likewise, the predicated pixel map is repeatedly calculated and updated, to present changes in the link-budget resulting from changes in the navigation-data. For example, the predicted pixel map can be repeatedly updated to show the predicted link-budget picture which is expected 10 Km ahead of the real-time position of the vehicle.

As indicated by the illustration in FIG. 4, the real-time pixel map shows that the target antenna (indicated by the black rectangle) is located outside the envelope of the on-board antenna. Therefore, the on-board antenna cannot be used for communicating with the target antenna in real-time. In order to establish a communication link between the aircraft and the target antenna, a different on-board antenna and/or a different target antenna should be used. Alternatively, the aircraft should be maneuvered to change its position in order to bring the target antenna within the envelope of the on-board antenna.

The predicted pixel map shows that given the predicted navigation-data and gain data of the aircraft at a future location, the target antenna is expected to be within the envelope of the on-board antenna.

In the illustrated example, window A also illustrates information pertaining to the relative position (e.g. range) between the aircraft and the target antenna. As is evident from the illustration, as the aircraft flies closer to the target antenna, the envelope of the on-board antenna increases.

Figure 5:
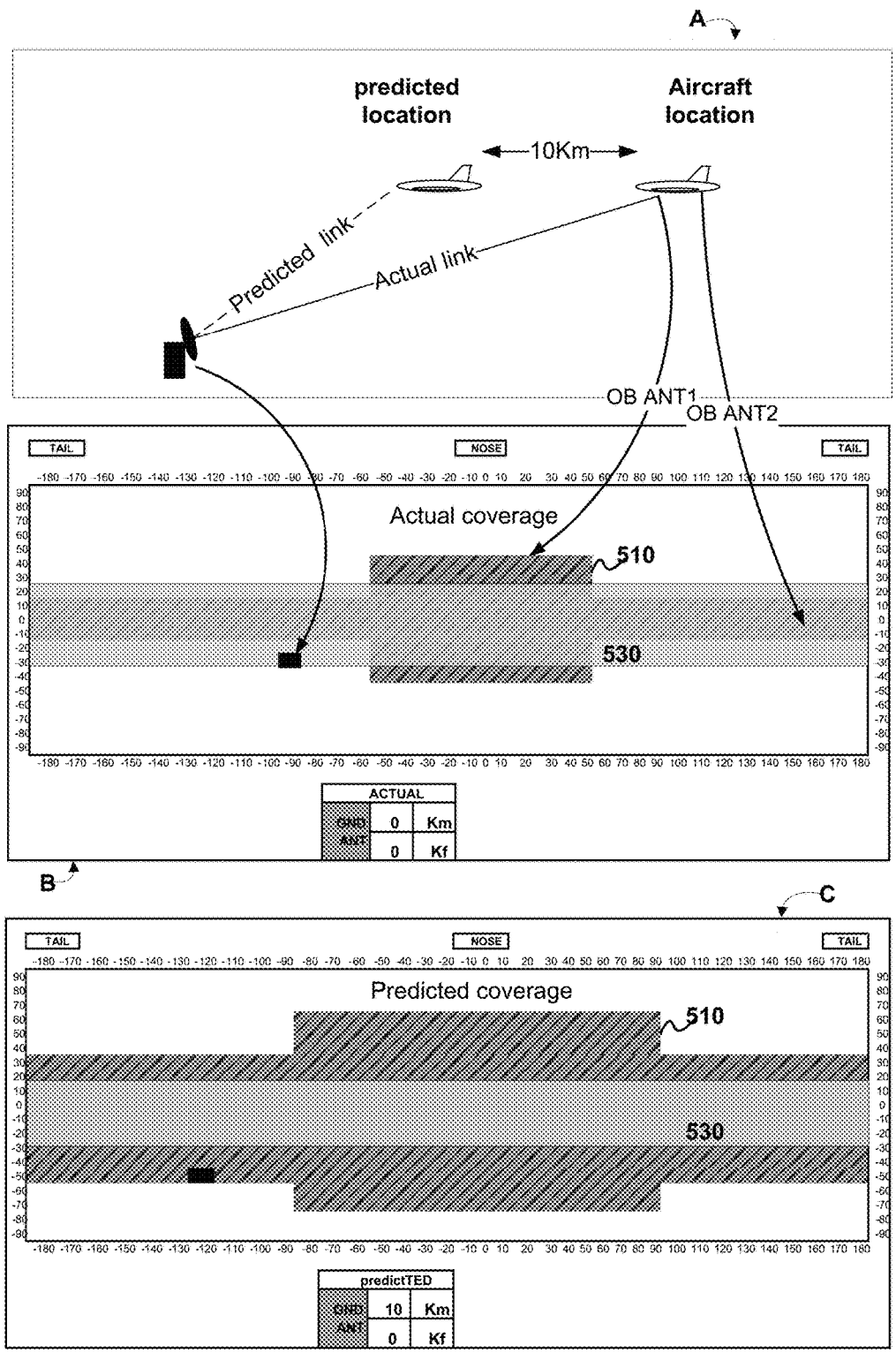
FIG. 5 is a schematic illustration of graphical user interface display in prediction mode, according to an example of the presently disclosed subject matter.

FIG. 5 is another example of a schematic illustration of graphical user interface display in prediction mode, similar to FIG. 4. In FIG. 5 the dynamic pixel maps of two different on-board antennas (OB ANT1, OB ANT2) are shown. Window B shows the real-time pixel map 510 of a first on-board antenna and the real-time pixel map 530 of a second on-board antenna. Window C shows the predicated pixel map 510 of the first on-board antenna and the predicated pixel map 530 of the second on-board antenna. As seen in the illustrated example, in real-time the target antenna is located outside the envelope of the first on-board antenna but within the envelope of the second on-board antenna. Thus, for example communication control unit on-board the aircraft can be switched to use the second antenna for communicating with the target antenna.

Window C shows that, given the predicted navigation-data and gain data the relative position of the target antenna is expected to be within the envelope of the first on-board antenna and outside the envelope of the second on-board antenna. Therefore, as the aircraft progresses towards the target antenna, communication control unit on-board the aircraft can be switched to use the first antenna for communicating with the target antenna, in order to maintain continuous communication link with the aircraft.

Figure 6:
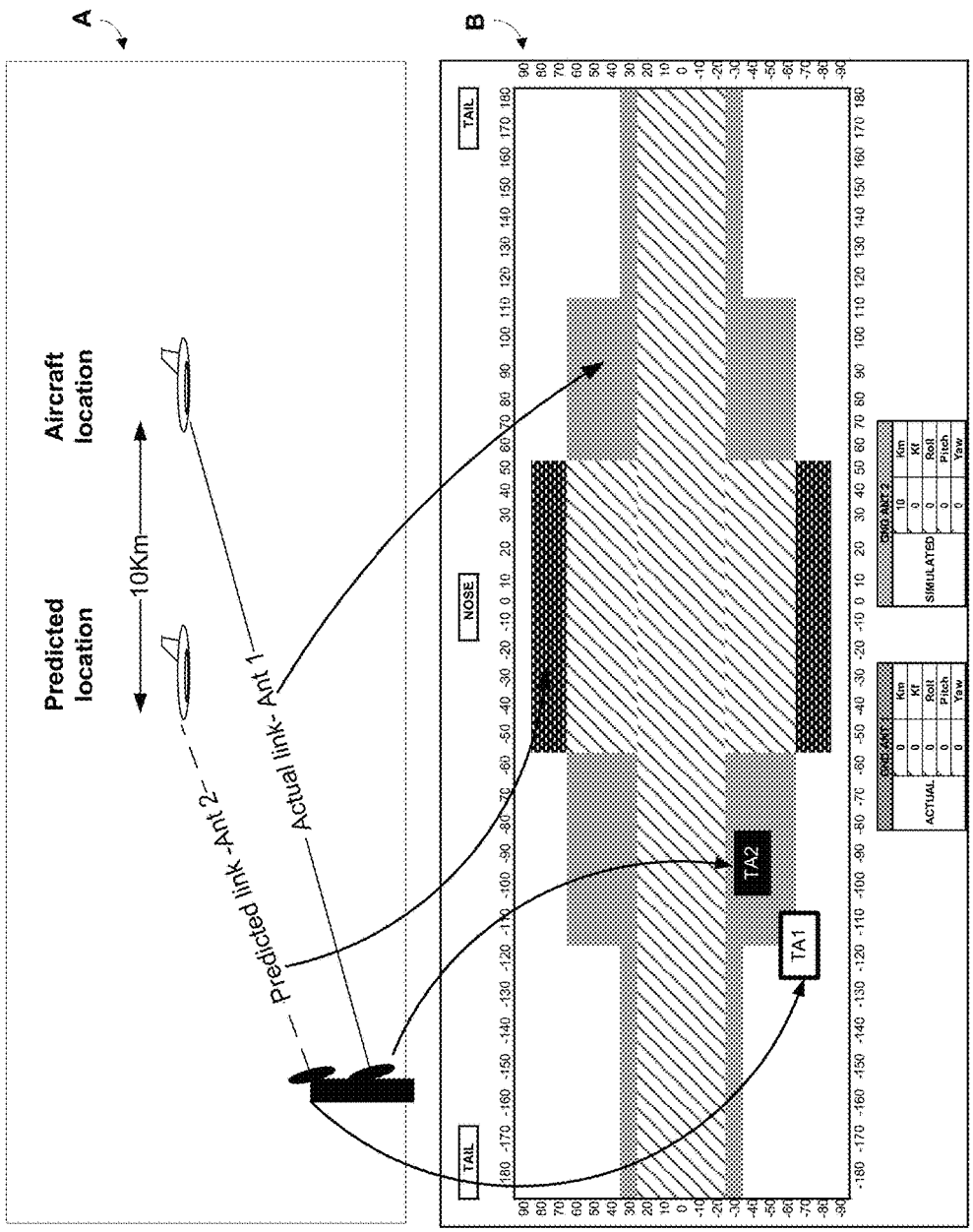
FIG. 6 is a schematic illustration of graphical user interface display, according to an example of the presently disclosed subject matter.

FIG. 6 is another schematic illustration of graphical user interface display, according to an example of the presently disclosed subject matter. Different than FIG. 4 that shows the real-time pixel map and predicated pixel map in two different windows, in FIG. 6 both pixel maps are shown in the same window. The real-time pixel map is shown by the solid gray area. The predicated pixel map is shown by the striped area. FIG. 6 also shows two different target antennas, TA1 and TA2. As can be seen from the illustration, there is an overlapping area between the real-time pixel map and the predicted pixel map. While some of the areas covered by the real-time pixel map are absent from the predicted pixel map, there are two new regions which are covered by the predicted pixel map but not the real-time pixel map (the dotted region at the top and bottom of the pixel map).

The graphical display also shows the relative position of each one of the two target antenna with respect to each one of the pixel maps. This allows an operator to select an appropriate target antenna for communicating with the aircraft based on the envelope of each antenna. Furthermore, an operator or pilot can follow the displayed information and prepare for upcoming changes in the envelope of different antenna and switch between different on-board antennas and/or target antennas to avoid or reduce communication link loss.

It is to be understood that some aspects of the presently disclosed subject matter may be a suitably programmed computer. Likewise, the presently disclosed subject matter contemplates a non-transitory computer storage device being readable by a computer for executing the method of the presently disclosed subject matter. The presently disclosed subject matter further contemplates a computer-readable memory (transitory and non-transitory) tangibly embodying a program of instructions executable by the computer for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer-implemented method of monitoring dynamic link-budget of at least one on-board antenna fixed on a vehicle; the computer comprising at least one processor, the method comprising operating the at least one processor for:
(i) calculating link-budget of the at least one on-board antenna with respect to at least one target antenna; the link-budget comprises a respective link-budget gain value assigned to each pixel in a collection of pixels, where each pixel in the collection of pixels represents a respective radiation vector in a three-dimensional space around the at least one antenna; and wherein the link-budget is calculated based on input data including gain data of the at least one antenna and navigation-data;
determining for each pixel in the collection of pixels, compliance of the respective link-budget gain value with a threshold value, thereby obtaining a respective antenna envelop of the at least one on-board antenna;
displaying on a computer display device graphical representation of a pixel map representing at least the respective antenna envelope; wherein the pixel map indicates with respect to each pixel, compliance with the threshold value, along with an indication of the relative location of the at least one target antenna;
(ii) continuously monitoring dynamics of the input data and repeating the operations in (i) wherein in each repetition:
utilizing updated navigation-data, if such exists, for updating the pixel map, and displaying on the display device an updated graphical representation of the pixel map.

2. The method of claim 1 wherein the gain data comprises a respective radiation pattern of the at least one antenna, and radiation power of a transceiver operatively connected to the at least one antenna; and
the navigation-data comprises a relative position of the at least one antenna and the at least one target antenna.

3. The method of claim 1, further comprising:
wherein updated navigation-data includes any one of: navigation-data collected in real-time; or predicted navigation-data; and
continuously displaying graphical representation of the pixel map pertaining to real-time location of the vehicle and/or predicted location of the vehicle.

4. The method of claim 1, further comprising:
wherein there is a plurality of on-board antennas on the vehicle; and
generating and displaying graphical representation of a pixel map of each one of the plurality of on-board antennas.

5. The method of claim 4, further comprising displaying an overlap between the antenna envelop of different antennas of the plurality of on-board antennas.

6. The method of claim 1, wherein the collection of pixels in the pixel map are drawn over a two dimension spherical coordinate system.

7. The method of claim 1, further comprising generating the pixel map including: assigning one or more radiation pattern angles to a respective pixel in the pixel map.

8. The method of claim 1, further comprising:
wherein the navigation-data includes simulated navigation-data of a simulated progression path of the vehicle and the pixel map is a simulated pixel map generated based on the simulated navigation-data;
simulating link-budget of the at least one on-board antenna along the simulated progression path; and
generating output including location along the simulated progression path where communication loss with the target antenna is expected.

9. The method of claim 8 wherein there is a plurality of on-board antennas on the vehicle; the method comprising:
generating a switching scheme to be executed in real-time; the antennas switching scheme comprising instructions indicating when to switch between antennas in order to maintain continuous communication link to a target antenna.

10. The method of claim 1 based on the antenna envelop, autonomously generating antenna switching commands for switching between antennas to avoid communication loss.

11. The method of claim 1 further comprising: autonomously generating steering commands for controlling the vehicle and maintaining the vehicle within the antenna envelope.

12. The method of claim 1 wherein the vehicle is an aircraft.

13. The method of claim 1 wherein displaying of the graphical representation of the pixel map is done in a manner which simulates a point of view seen from the front cabin of the vehicle.

14. A computer-implemented system for monitoring dynamic link-budget of at least one on-board antenna fixed on a vehicle; the computer-implemented system comprising at least one processing unit comprising one or more computer processors operatively connected to computer memory; the at least one processing unit is configured to:
 (i) calculate link-budget of the at least one on-board antenna with respect to at least one target antenna; the link-budget comprises a respective link-budget gain value assigned to each pixel in a collection of pixels, where each pixel in the collection of pixels represents a respective radiation vector in a three-dimensional space around the at least one antenna; and wherein the link-budget is calculated based on input data including gain data of the at least one antenna and navigation-data;
 determine for each pixel in the collection of pixels, compliance of the respective link-budget gain value with a threshold value, thereby obtaining a respective antenna envelop of the at least one on-board antenna;
 display on a computer display device graphical representation of a pixel map representing at least the respective antenna envelope; wherein the pixel map indicates with respect to each pixel, compliance with the threshold value, along with an indication of the relative location of the at least one target antenna;
 (ii) continuously monitor dynamics of the input data and repeating the operations in (i) wherein in each repetition:
 utilize updated navigation-data, if such exists, for repeatedly updating the pixel map, and displaying on the display device an updated graphical representation of the pixel map.

15. The system of claim 14 wherein:
 updated navigation-data includes any one of: navigation-data collected in real-time; or predicted navigation-data;
 the at least one processing unit is configured to cause continuous display of graphical representation of the pixel map pertaining to real-time location of the vehicle and/or predicted location of the vehicle.

16. The system of claim 14 further comprising a navigation unit configured to determine real-time navigation-data.

17. The system of claim 14 further comprising a user interface including a display device, and wherein there is a plurality of on-board antennas on the vehicle, the user interface is configured to display graphical representation of a pixel map of each one of the plurality of on-board antennas each.

18. The system of claim 14 wherein the collection of pixels in the pixel map are drawn over a two dimension spherical coordinate system.

19. The system of claim 14 wherein the navigation-data includes simulated navigation-data of a simulated progression path of the vehicle and the pixel map is a simulated pixel map, generated based on the simulated navigation-data; the at least one processing unit is configured to:
 simulate link-budget of the at least one on-board antenna along the simulated progression path; and
 generate output including location along the simulated progression path where communication loss with the target antenna is expected.

20. The system of claim 19 wherein there is a plurality of on-board antennas on the vehicle; the at least one processing unit is configured to:
 generate a switching scheme to be executed in real-time; the antennas switching scheme comprising instructions indicating when to switch between antennas in order to maintain continuous communication link with a target antenna.

21. The system of claim 14 wherein the at least one processing unit is further configured to autonomously generate antenna switching instructions, for switching between antennas in order to switch to avoid communication loss with the target antenna.

22. The system of claim 14 further configured to autonomously generate steering commands for controlling the vehicle and maintaining the vehicle within the antenna envelope.

23. A non-transitory program storage device readable by a computer, tangibly embodying computer readable instructions executable by the computer to perform a method of monitoring dynamic link-budget of at least one on-board antenna fixed on a vehicle; the computer comprising at least one processing unit, the method comprising operating the at least one processor for:
 (i) calculating link-budget of the at least one on-board antenna with respect to at least one target antenna; the link-budget comprises a respective link-budget gain value assigned to each pixel in a collection of pixels, where each pixel in the collection of pixels represents a respective radiation vector in three-dimensional space around the at least one antenna; and wherein the link-budget is calculated based on input data including: gain data of the at least one antenna and navigation-data;
 determining for each pixel in a collection of pixels, compliance of the respective link-budget gain value with a threshold value, thereby obtaining a respective antenna envelop of the at least one on-board antenna;
 displaying on a computer display device graphical representation of a pixel map representing at least the respective antenna envelope; wherein the pixel map indicates with respect to each pixel, compliance with the threshold value, along with an indication of the relative location of the at least one target antenna;
 (ii) continuously monitoring dynamics of the input data and repeating the operations in (i) wherein in each repetition:
 using updated navigation-data, if such exists, for updating the pixel map, and displaying on the display device an updated graphical representation of the pixel map.

24. A computer-implemented system for monitoring dynamic link-budget of at least one on-board antenna fixed on a vehicle;
 the computer-implemented system comprising at least one computer configured and operable to:
 calculate link-budget of the at least one on-board antenna with respect to at least one target antenna; the link-budget comprises a respective link-budget value assigned to each pixel in a collection of pixels, where each pixel in the collection of pixels represents a respective radiation vector in a three-dimensional space around the at least one antenna; and wherein the link-budget is calculated based on input data including gain data and navigation-data;

determine for each pixel in the collection of pixels, compliance of the respective link-budget value with a sensitivity threshold value of the transceiver, thereby obtaining a respective antenna envelope of the at least one on-board antenna;

generate a pixel map representing at least the respective antenna envelope; wherein the pixel map indicates with respect to each pixel, compliance with the threshold value, along with an indication of the relative location of the at least one target antenna;

continuously monitor dynamics of the input data and utilizing updated navigation-data, if such exists, for repeatedly updating the pixel map.

25. A vehicle comprising a system for monitoring dynamic link-budget of at least one on-board antenna fixed on the vehicle; the system comprising at least one computer configured and operable to:

calculate link-budget of the at least one on-board antenna with respect to at least one target antenna; the link-budget comprises a respective link-budget value assigned to each pixel in a collection of pixels, where each pixel in the collection of pixels represents a respective radiation vector in a three dimensional space around the at least one antenna; and wherein the link-budget is calculated based on input data including gain data and navigation-data;

determine for each pixel in the collection of pixels, compliance of the respective link-budget value with a sensitivity threshold value of the transceiver, thereby obtaining a respective antenna envelope of the at least one on-board antenna;

generate a pixel map representing at least the respective antenna envelope; wherein the pixel map indicates with respect to each pixel, compliance with the threshold value, along with an indication of the relative location of the at least one target antenna; and continuously monitor dynamics of the input data and utilizing updated navigation-data, if such exists, for repeatedly updating the pixel map.

* * * * *